June 23, 1942. J. B. PARSONS 2,287,269
MECHANISM FOR IMPARTING RECTILINEAR RECIPROCATING MOVEMENT
TO MEMBERS SUCH AS VEHICLE WINDOWS
Filed Sept. 4, 1940 2 Sheets-Sheet 2
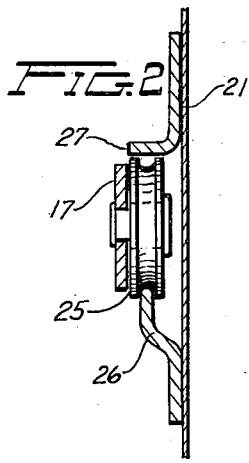
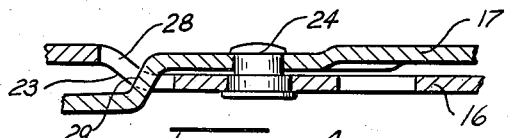
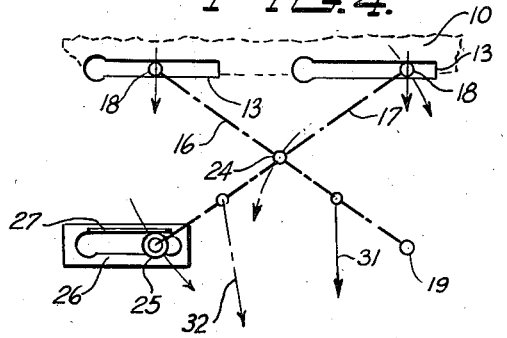
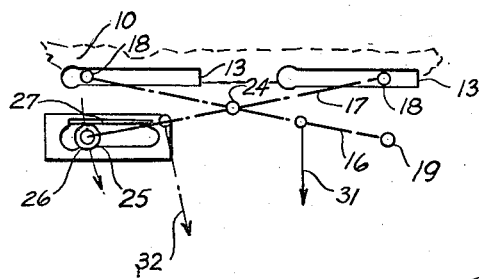
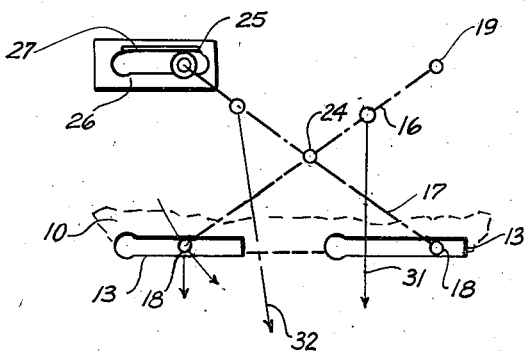
Inventor
John B. Parsons
By Malcolm W. Fraser
Attorney Patented June 23, 1942

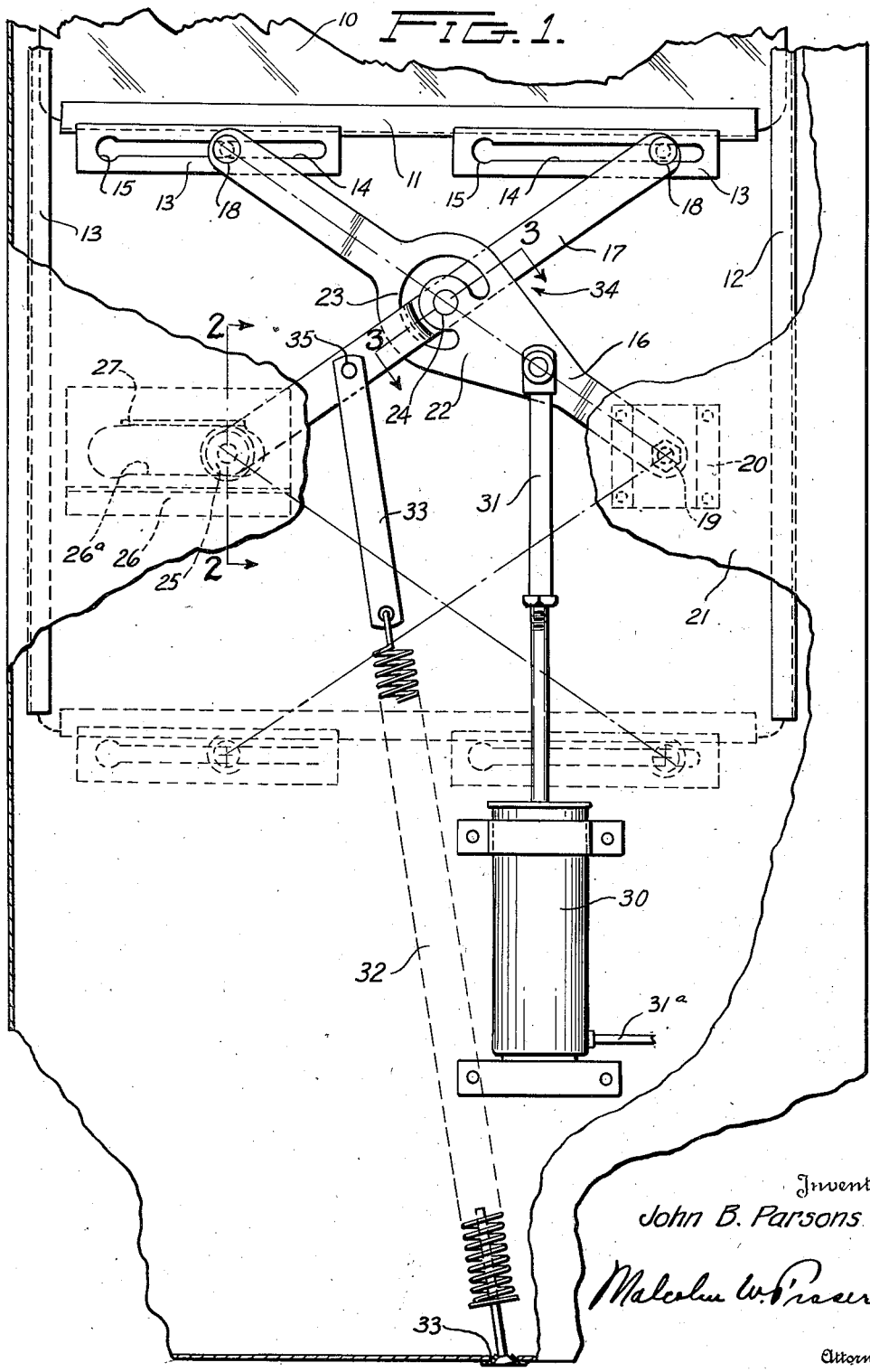

REISSUED OCT 20 1942

2,287,269

UNITED STATES PATENT OFFICE 2,287,269

MECHANISM FOR IMPARTING RECTILINEAR RECIPROCATING MOVEMENT TO MEMBERS SUCH AS VEHICLE WINDOWS

John B. Parsons, Toledo, Ohio

Application September 4, 1940, Serial No. 355,350

2 Claims. (Cl. 268—126)

This invention relates to rectilinearly movable members but more particularly to mechanism for imparting rectilinear movement to such members, such, for example, as a vehicle window which is rectilinearly slid or reciprocated between open and closed positions.

An object is to produce a new and improved mechanism of the above character which embodies a coil spring arranged to resist the movement of the member in one direction and assist in the movement in the opposite direction, the parts being so constructed and arranged that the spring exerts a substantially uniform force or pull to the rectilinearly movable member when the latter is moved in a direction to tension the spring.

Another object is to produce a new and improved window regulator mechanism embodying a contractile spring and in which the parts are so constructed and arranged that during the tensioning or stretching of the spring, a substantially uniform force is exerted against the window to move it in the opposite direction.

Other objects and advantages of the invention will hereinafter appear and for purposes of illustration but not of limitation, an embodiment of the invention is shown on the accompanying drawings in which Figure 1 is a side elevation of an automobile door, parts being broken away to illustrate the regulator mechanism for moving the window glass to and from closed position;

Figure 2 is an enlarged vertical sectional elevation on the line 2—2 of Figure 1;

Figure 3 is an enlarged sectional view on the line 3—3 of Figure 1; and

Figures 4, 5 and 6 are diagrammatic views showing the position assumed by the parts when the window is in its fully raised position, its intermediate position, and its fully lowered position respectively.

Referring to the drawings, a U-shaped channel 11 embraces the lower edge of the automobile window glass 10, and vertically disposed channel strips 12 provide guides for the side edges of said window glass 10. A pair of retainers 13 having longitudinally elongate slots 14 therein, said slots each having an enlarged end portion 15 for assembly purposes, are fixed to and depend from the channel 11.

The window glass 10 is raised and lowered by a window regulator mechanism 34 which includes a pair of crossed arms 16 and 17. An end of each of the arms 16 and 17 is slidably mounted by means of studs 18 engaging in the slots 14 of the retainers 13. The arm 16 is pivotally fixed at its other end by bolt means 19 attached to a stationary bracket 20 which may be mounted on the panel 21. The arm 16 has an enlarged central portion 22 provided with a slot 23 and a pin 24 forms a pivotal connection between the arms 16 and 17. Mounted on the opposite end of the arm 17 is a grooved roller 25 which rides in a horizontal track 26a in a bracket 26 and is retained from upward movements by a horizontal out-turned flange 27. Both arms 16 and 17 are off-set near their center, as shown at 28 and 29, and the arm 17 extends through the arcuate slot 23, all as indicated on Figure 3.

In this instance the cross arm regulator is actuated by a hydraulic device which includes a cylinder 30 having a piston (not shown) and piston rod 31 which in turn is pivoted to the arm 16 intermediate the pivot 19 and pin 24. It is not essential to the invention that hydraulic means be used because any suitable means such as a crank handle may be employed for actuating the regulator, as will be readily understood. The piston rod is moved in one direction or the other by liquid which is forced into or from the cylinder 30 through a tube 31a by any suitable means.

A helical contractile spring 32 is connected at one end by a link 33 which is pivoted at 35 to arm 17 substantially equidistantly between the roller 25 and pin 24. The other end of the spring 32 is secured by a tapered socket fastener 33 to enable the spring to change position as the cross arm regulator 34 moves between its raised and lowered positions. The spring inclines in the same general direction as arm 16 when the regulator is in its raised position so that said spring makes an acute angle with a line defining the direction of the rectilinear reciprocatory movement of the window.

It is to be understood that upon upward movement of the piston rod 31 the cross arm regulator 34 operates to raise the window, the coil spring 32 being thereby extended. Upon downward movement of the piston rod 31, the regulator 34 causes the window to move downwardly or toward its fully open position as indicated by dotted lines on Figure 1. In such movement the coil spring 32 assists, as will be readily apparent.

Ordinarily it will be recognized that a contractile spring as it is gradually extended such as by raising of the window in the present case, the tension gradually increases, so that the more the spring is stretched, the more tension or resistance is imparted to the closing or upward movement of the window. In accordance with this invention, the force exerted by the spring 32 when in any of its various positions is approximately the same. For example, with a coil spring which, when fully stretched or extended, exerts a force of 135 pounds, it has been empirically established that with the arrangement shown, a force of 26 pounds will be exerted when the window is in its lowermost position, 32 pounds in its central position, and 28 pounds in its uppermost position. Although these forces are not entirely uniform, they so closely approach uniformity as greatly to enhance the ease by which the window may be actuated.

It is difficult accurately to explain exactly why the above mechanism affords approximately uniform spring pressures, but one explanation is as follows:

As the window moves between its open and closed positions, the effective force exerted by the spring on the window remains approximately uniform because of the particular form and mounting of the cross arm regulator. Perhaps the most essential single feature in the construction is the roller 25 mounted at the end of arm 17 and riding along the track 26a. The component of the spring force which acts on the roller is regulated by the particular position thereof, and is of such magnitude in the various positions of the roller that the effective force exerted by the spring on the window is approximately uniform.

When the window is closed the regulator is arranged as shown in Figure 4, the spring being in its most extended position and, therefore, a large part of the force exerted by the spring must be utilized at a point where it will not be effective in lowering the window so that the effective force exerted by the spring on the window will be nearly the same as it is in the lowered window position. As the window 10 is lowered by the combined action of its own weight, the piston rod 31 and the spring 32, the roller is forced outwardly by the scissors-like arms. The spring is so disposed that as the window moves between its fully closed and intermediate positions, one component of the total force exerted by the spring acts to oppose this outward movement of the roller 25 so that a smaller part of the force exerted by the spring will act effectively on the window than at the lower window positions. After passing through its intermediate position, as shown in Figure 5, the roller moves inwardly, or to the right of the figure, and the spring 32 now has a component of its force helping to move the roller in that direction. From Figure 6 it is clear that in these lower positions the spring force which is gradually becoming weaker, is exerted more nearly in a direction longitudinally of the arm 17 which carries the roller, and, therefore, a greater part of the force exerted by the spring acts effectively upon the window to lower it than in the more fully raised window positions.

Since the effective force of the spring on the window is transmitted to the window through the studs 18, a force acting directly along the arm 17 when the arms are disposed at a ninety degree angle with respect to each other, will be the most effective on the window. This force will exert the greatest torque tending to rotate the arm 16 about its pivot 19 and lower the window. A comparison of Figures 4, 5 and 6 shows that this condition is approached most nearly when the window is in lowered position. The component of the spring force acting longitudinally of the arm 17 is greatest and the arms are disposed at as large an angle with respect to each other as at any other position when the window is so disposed. In this position the spring is in its most contracted state although still exerting some force downwardly of the window and a greater part of the force which it exerts must act upon the window than in the raised position so that the effective force remains approximately uniform.

It should be noticed that the portion of the arm 17 between the pivot 24 and the stud 18 may be omitted without affecting the operation of the regulator in performing its function of keeping the effective force exerted by the spring on the window approximately uniform. The purpose of this part of the arm 17 is to prevent binding of the window against the channels 12 as it moves between its open and closed positions.

It is essential in order for the effective force exerted on the window to remain approximately uniform, that the lower attachment of the spring be disposed approximately as shown in Figure 1. If this attachment 33 were moved quite substantially to the left of the position shown, the direction of the force exerted by the spring would approach a nearly longitudinal direction with the arm 17 and a large part of the force would be effective on the window in its raised position. When the window is open, the force of the spring is directed at a much greater angle with arm 17 than before and, therefore, a much smaller part of the force exerted by the now contracted spring will be effective on the window. The effective force would vary from a large one at the closed position to a much smaller force at the open window position. Movement of the spring attachment to the right of the position produces a greatly varying force just the reverse of that already described. The spring will act nearly longitudinally relative to the arm 17 in the lowered window position so that the effective force will vary from small to large as the window moves from its open to its closed position.

It is to be understood that numerous changes in details of construction, arrangement and operation may be effected without departing from the spirit of the invention especially as defined in the appended claims.

What I claim is:

1. Means for effecting movement of a member in opposite directions, composed of two arms pivotally connected to have scissor-like movement, means to connect an end portion of one of said arms to the member to actuate the latter, means to pivotally connect the opposite end portion of said arm to a relatively fixed point, means connected to said opposite end portion of said arm to actuate same and thereby the member, means to mount the end portion of the other arm which lies adjacent to the said opposite end portion of the first named arm for sliding and pivotal movement, a spring device connected at one end to said other arm at a point between the pivotal point of the arms and the said end of said other arm, and depending therefrom, and means to connect the opposite end of the spring device to a relatively fixed point whereby said spring device lies in a plane at an acute angle to a vertical line drawn through the pivot of the arms in all positions thereof.

2. Means for effecting movement of a member in opposite directions in accordance with claim 1, wherein the spring device includes a link pivoted at one end to said other arm and a coil spring connected to the opposite end of the link.

JOHN B. PARSONS.